US012413034B2

(12) United States Patent
Murata

(10) Patent No.: US 12,413,034 B2
(45) **Date of Patent: *Sep. 9, 2025**

(54) ELECTRODE CONNECTION STRUCTURE AND DETECTION DEVICE

(71) Applicant: KELK Ltd., Kanagawa (JP)

(72) Inventor: Tomonori Murata, Kanagawa (JP)

(73) Assignee: KELK Ltd., Kanagawa (JP)

( * ) Notice: Subject to any disclaimer, the term of this patent is extended or adjusted under 35 U.S.C. 154(b) by 0 days.

This patent is subject to a terminal disclaimer.

(21) Appl. No.: 18/478,256

(22) Filed: Sep. 29, 2023

(65) Prior Publication Data

US 2024/0030669 A1 Jan. 25, 2024

Related U.S. Application Data

(63) Continuation of application No. 17/554,244, filed on Dec. 17, 2021, now Pat. No. 11,811,179.

(30) Foreign Application Priority Data

Dec. 24, 2020 (JP) ................................ 2020-214580

(51) Int. Cl.
*H01R 39/10* (2006.01)
*H01R 39/06* (2006.01)
*H01R 39/34* (2006.01)

(52) U.S. Cl.
CPC ............. *H01R 39/10* (2013.01); *H01R 39/34* (2013.01); *H01R 39/06* (2013.01)

(58) Field of Classification Search
CPC ......... H01R 39/34; H01R 39/10; H01R 39/06
See application file for complete search history.

(56) References Cited

U.S. PATENT DOCUMENTS 7,135,687 B2 * 11/2006 Lacey .................. A61B 6/4488 250/370.15
7,887,333 B1 * 2/2011 Justin ..................... H01R 39/64 439/21

(Continued)

FOREIGN PATENT DOCUMENTS

JP S62-278779 A 12/1987
JP 2002-343526 A 11/2002

(Continued)

OTHER PUBLICATIONS

Office Action in Japanese Appln. No. 2020-214580, mailed May 7, 2024, 5 pages (with English machine translation).

(Continued)

*Primary Examiner* — Renee S Luebke
*Assistant Examiner* — Paul D Baillargeon
(74) *Attorney, Agent, or Firm* — Fish & Richardson P.C.

(57) ABSTRACT

An electrode connection structure includes a first electrode unit that includes first electrodes formed concentrically, and a second electrode unit that includes a second electrode formed into a needle shape axially movable forward and rearward and is electrically connectable to the first electrode unit, and in the electrode connection structure, the second electrode unit includes a plurality of the second electrodes that is arranged in a circumferential direction and arranged at different radial positions, and the plurality of the second electrodes is electrically connected to the first electrodes arranged at different radial positions, respectively.

13 Claims, 6 Drawing Sheets

(56) References Cited

U.S. PATENT DOCUMENTS

| | | | | |
|---|---|---|---|---|
| 8,142,200 | B2 * | 3/2012 | Crunkilton | A61N 7/02 439/21 |
| 11,811,179 | B2 * | 11/2023 | Murata | H01R 13/622 |
| 2004/0022351 | A1 | 2/2004 | Lacey et al. | |
| 2004/0071259 | A1 | 4/2004 | Lacey et al. | |
| 2008/0243003 | A1 | 10/2008 | Crunkilton et al. | |
| 2008/0243035 | A1 | 10/2008 | Crunkilton | |
| 2022/0209480 | A1 | 6/2022 | Murata | |

FOREIGN PATENT DOCUMENTS

| | | | |
|---|---|---|---|
| JP | 2003-116249 | A | 4/2003 |
| JP | 2003-243119 | A | 8/2003 |
| JP | 2004057834 | A | 2/2004 |
| JP | 2010522618 | A | 7/2010 |
| JP | 2013-138010 | A | 7/2013 |

OTHER PUBLICATIONS

Office Action in Japanese Appln. No. 2020-214580, mailed Aug. 27, 2024, 6 pages (with English machine translation).

Office Action in Japanese Appln. No. 2020-214580, mailed Jan. 14, 2025, 7 pages (with English machine translation).

* cited by examiner

ELECTRODE CONNECTION STRUCTURE AND DETECTION DEVICE

CROSS-REFERENCE TO RELATED APPLICATION(S)

The present application is a Continuation Application of U.S. patent application Ser. No. 17/554,244, filed on Dec. 17, 2021, which claims priority to and incorporates by reference the entire contents of Japanese Patent Application No. 2020-214580, filed in Japan, on Dec. 24, 2020.

BACKGROUND OF THE INVENTION

1. Field of the Invention

The present disclosure relates to an electrode connection structure and a detection device.

2. Description of the Related Art

JP 2002-343526 A discloses a technology related to transmission of an electric signal between a rotation system and a stationary system that perform relative rotational movement. This technology provides a slip ring device that includes a conductor ring and a conductor brush portion that makes contact with the conductor ring by a pressing force of a leaf spring. In this technology, the conductor ring rotates circumferentially and a conductor brush slides on the conductor ring.

JP 2003-243119 A discloses a technology related to electrical connection between a fixed body and a rotation body that are relatively rotatable. JP 2003-243119 A discloses a clock spring that includes an annular slip ring provided on the fixed body and a slide contactor provided on the rotation body.

In the technology described in JP 2002-343526 A, the conductor brush needs to have a width larger than a radial width of the conductor ring. When the width of the conductor brush is small, the pressing force of the leaf spring decreases. Reducing the width of the conductor brush is difficult, and thus, increasing the wiring density thereof is difficult.

The technology described in JP 2003-243119 A is premised on use in the fixed body and the rotation body that are relatively rotated. Therefore, it is difficult to apply this technology to electrical connection between members that are not relatively rotated but are secured to each other.

An object of the present disclosure is to provide an electrode connection structure and a detection device that are suitable for members threadedly engaged with each other and secured to each other.

SUMMARY OF THE INVENTION

It is an object of the present invention to at least partially solve the problems in the conventional technology.

According to an aspect of the present invention, an electrode connection structure comprises: a first electrode unit that includes first electrodes formed concentrically; and a second electrode unit that includes a second electrode formed into a needle shape axially movable forward and rearward and is electrically connectable to the first electrode unit; wherein the second electrode unit includes a plurality of the second electrodes that is arranged in a circumferential direction and arranged at different radial positions, and the plurality of the second electrodes is electrically connected to the first electrodes arranged at different radial positions, respectively.

According to another aspect of the present invention, a detection device comprises: the electrode connection structure; a thermoelectric module; a sensor; and a controller.

The above and other objects, features, advantages and technical and industrial significance of this invention will be better understood by reading the following detailed description of presently preferred embodiments of the invention, when considered in connection with the accompanying drawings.

DETAILED DESCRIPTION OF THE PREFERRED EMBODIMENTS

Embodiments according to the present disclosure will be described below with reference to the drawings, but the present disclosure is not limited to the embodiments. Components of the embodiments described below may be appropriately combined with each other. Furthermore, in some cases, some of the components may not be used.

In the embodiments, a positional relationship between respective units will be described using the terms “left”, “right”, “front”, “rear”, “upper”, and “lower”. These terms indicate relative positions or directions based on the center of a detection device 1. A horizontal direction, a front-rear direction, and a vertical direction are orthogonal to each other.

Embodiment

Detection Device

Figure 1:
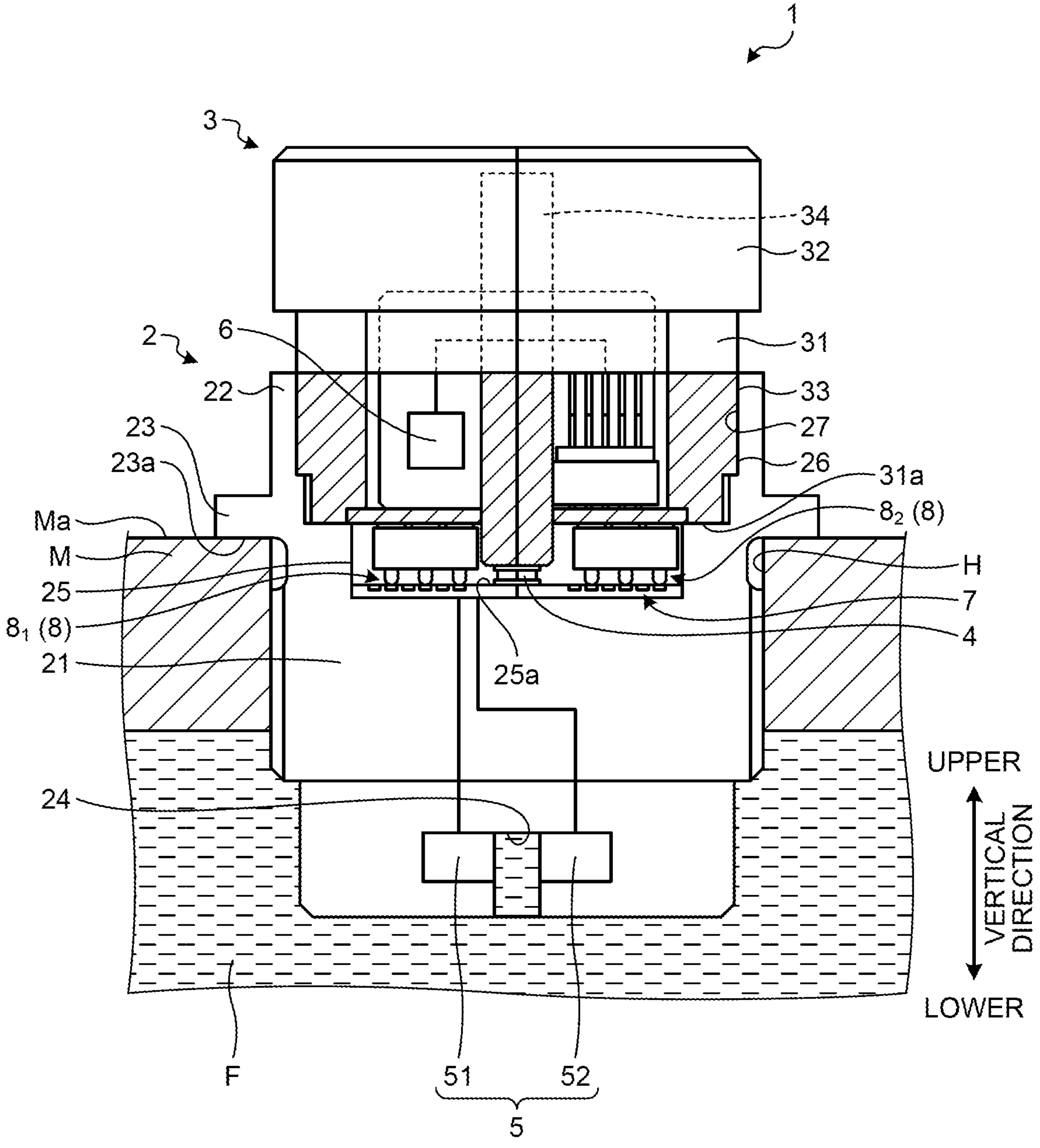
FIG. 1 is a partial cross-sectional view illustrating a detection device according to an embodiment.
Figure 2:
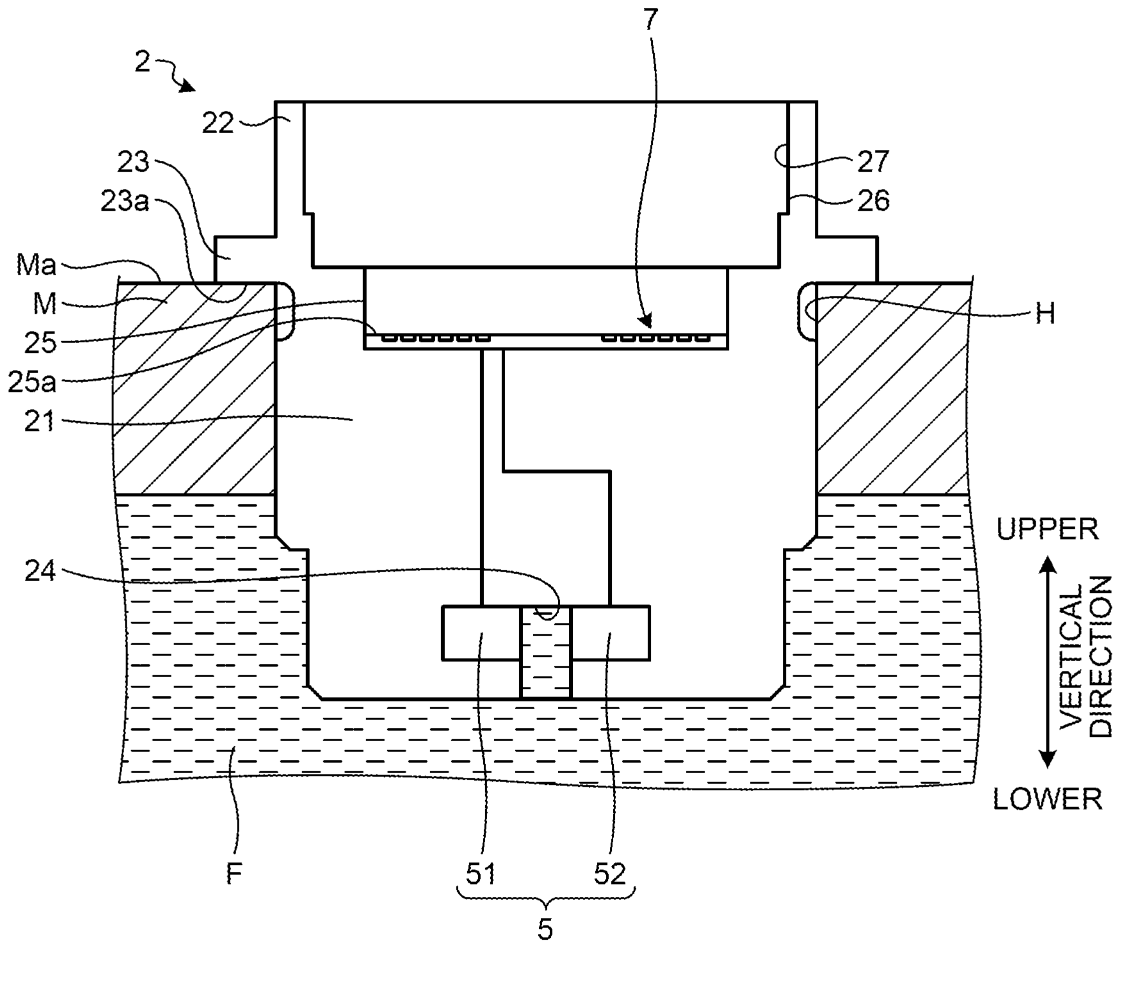
FIG. 2 is a partial cross-sectional view illustrating a first member of the detection device according to the embodiment.
Figure 3:
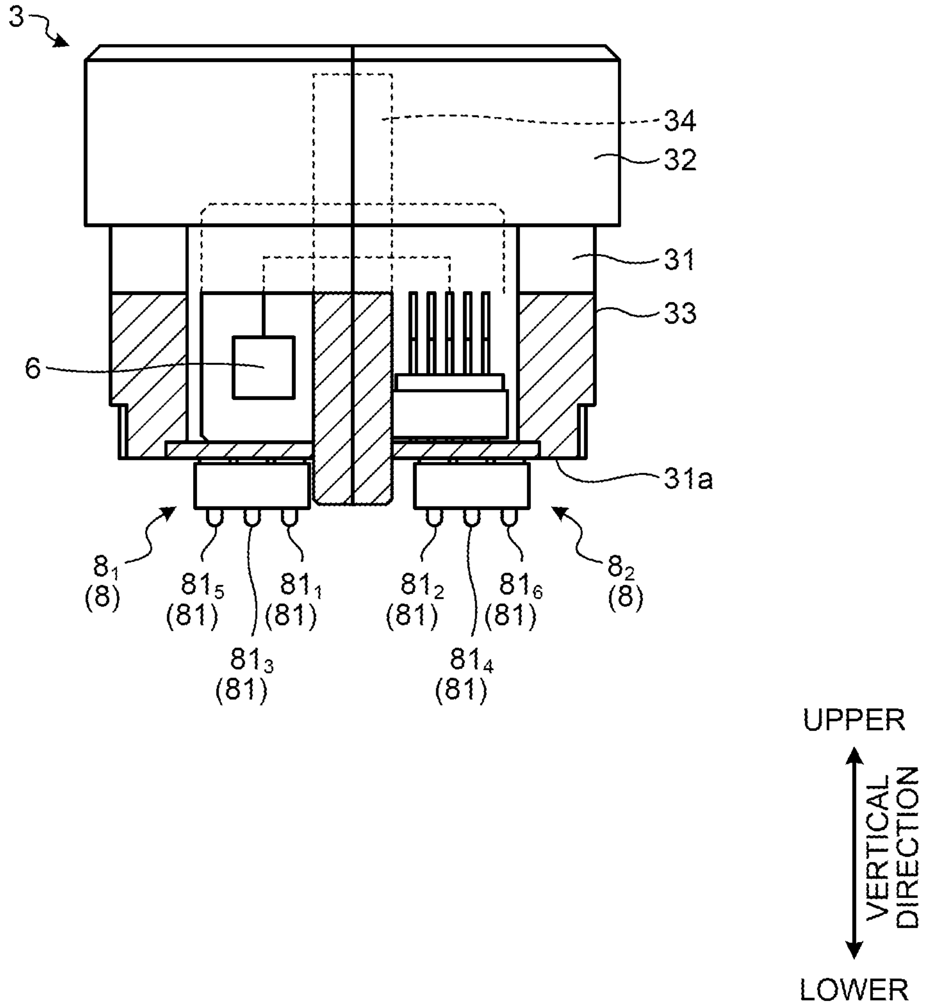
FIG. 3 is a partial cross-sectional view illustrating a second member of the detection device according to the embodiment.

FIG. 1 is a partial cross-sectional view illustrating the detection device according to an embodiment. FIG. 2 is a partial cross-sectional view illustrating a first member of the detection device according to the embodiment. FIG. 3 is a partial cross-sectional view illustrating a second member of the detection device according to the embodiment. As illustrated in FIG. 1, the detection device 1 is installed at, for example, a device M arranged in a construction machine or factory equipment. The detection device 1 detects, for example, a state of impurities or the like contained in a fluid F such as a lubricant or working fluid of the device M. In the following description, the axial direction of the detection device 1 is the vertical direction. One side in the axial direction is an upper side, and the other side in the axial direction is a lower side.

The device M is provided with a through-hole H communicating with a flow path for the fluid F such as a lubricant or working fluid. The through-hole H is formed in, for example, a gear box, a transaxle, a pipe of a hydraulic system, or the like of the device M. The detection device 1 is mounted in the through-hole H.

The detection device 1 is configured to be partially fitted into the through-hole H. The detection device 1 includes a first member 2 and a second member 3. The detection device 1 further includes a thermoelectric generation module 4, a detection unit 5, and a controller 6. The detection device 1 can be used when the first member 2 and the second member 3 are assembled. In the embodiment, while the detection device 1 is used, the first member 2 is positioned on the lower side, and the second member 3 is positioned on the upper side. In the detection device 1, the first member 2 and the second member 3 are electrically connected by an electrode connection structure. The electrode connection structure includes the first member 2, the second member 3, a first electrode unit 7, and a second electrode unit 8.

As illustrated in FIGS. 1 and 2, the first member 2 is fixed in the through-hole H of the device M. The detection unit 5, which is described later, is arranged in the first member 2. The first member 2 is formed of a material having high thermal conductivity. The first member 2 is formed of a metal such as a steel material or aluminum alloy. The first member 2 includes a main body portion 21 and a head portion 22. The main body portion 21 and the head portion 22 are integrally formed with each other.

The main body portion 21 is formed into a cylindrical shape. The main body portion 21 is formed into a shape fitted into the through-hole H. The detection unit 5, which is described later, is arranged in the main body portion 21.

The head portion 22 is arranged at the upper portion of the main body portion 21. The head portion 22 is formed into a cylindrical shape. In a state where the detection device 1 is mounted in the through-hole H, the head portion 22 is positioned above the through-hole H. A flange portion 23 is formed below the head portion 22.

The flange portion 23 is formed into a flange shape with respect to the head portion 22. The flange portion 23 has a diameter that is larger than the diameter of the main body portion 21 and the diameter of the head portion 22. The flange portion 23 has a surface 23*a* facing downward that makes contact with a surface Ma of the device M while the detection device 1 is mounted in the through-hole H. The flange portion 23 restricts the detection device 1 from falling into the through-hole H.

A recess 24 is arranged at a lower end of the main body portion 21. The recess 24 opens downward. The recess 24 is connected to the through-hole H. The fluid F is allowed to flow into the recess 24. The recess 24 is arranged in an optical path from a light emitting element 51 to a light receiving element 52 of the detection unit 5, which is described later.

A recess 25 is arranged at an upper end of the main body portion 21. The recess 25 opens upward. The recess 25 has a surface 25*a* facing upward on which the thermoelectric generation module 4 and the first electrode unit 7, which are described later, are arranged. The recess 25 is configured to house a lower end of the second member 3.

A recess 26 is arranged in the head portion 22. The recess 26 opens upward. The recess 26 is arranged above the recess 25. The recess 26 has a diameter that is larger than the diameter of the recess 25. The recess 26 is connected to the recess 25. The recess 26 is configured to house an intermediate portion of the second member 3.

A female threaded portion 27 is formed on a peripheral surface of the recess 26, that is, an inner peripheral surface of the head portion 22. The second member 3 has a male threaded portion 33 that is threadedly engaged with the female threaded portion 27. The female threaded portion 27 is threadedly engaged with the male threaded portion 33 of the second member 3, and thus, the first member 2 and the second member 3 are secured to each other.

As illustrated in FIGS. 1 and 3, the controller 6 is arranged in the second member 3. The second member 3 is assembled to the first member 2 fixed in the through-hole H of the device M. The second member 3 is threadedly engaged with and secured to the first member 2. The second member 3 includes a main body portion 31 and a head portion 32. The main body portion 31 and the head portion 32 are integrally formed with each other. The second member 3 further includes a heat transfer unit 34.

The main body portion 31 is formed into a cylindrical shape. The main body portion 31 is inserted into the recess 26 of the head portion 22 of the first member 2. The controller 6, which is described later, is arranged inside the main body portion 31. The main body portion 31 is formed of a material having low thermal conductivity, such as a resin, to suppress thermal conduction between the first member 2 and the main body portion 31. The main body portion 31 is formed of a material having thermal conductivity lower than that of the first member 2.

The head portion 32 is arranged at the upper portion of the main body portion 31. The head portion 32 has a diameter that is larger than the diameter of the main body portion 31. The head portion 32 is formed of a material having thermal conductivity higher than that of the main body portion 31. In a state where the detection device 1 is mounted in the through-hole H, the head portion 32 is positioned above the first member 2. The head portion 32 is formed of a metal such as a steel material or aluminum alloy. The head portion 32 is exposed to the atmosphere around the detection device 1. The head portion 32 releases heat transferred from the first member 2, to the atmosphere.

The male threaded portion 33 is formed on an outer peripheral surface of the main body portion 31. The male threaded portion 33 is threadedly engaged with the female threaded portion 27 of the first member 2. The male threaded portion 33 is threadedly engaged with the female threaded portion 27 on the peripheral surface of the recess 26, and thus, the first member 2 and the second member 3 are secured to each other.

The heat transfer unit 34 is arranged inside the main body portion 31 and the head portion 32. The heat transfer unit 34 is formed into a columnar shape. The heat transfer unit 34 is formed of a material having thermal conductivity higher than that of the main body portion 31. The heat transfer unit 34 is formed of a metal such as a steel material or aluminum alloy. The heat transfer unit 34 makes contact with the thermoelectric generation module 4. In the embodiment, the heat transfer unit 34 has a lower end that makes contact with a cooling plate of the thermoelectric generation module 4. The heat transfer unit 34 transfers heat, from first member 2 to the head portion 32 of the second member 3 via the thermoelectric generation module 4.

The second member 3 has a housing space in which a resin is filled. More specifically, after the controller 6 and the like are assembled inside the second member 3, a liquid resin material is filled in the housing space, and the resin material is solidified. The resin is filled so as to cover the entire controller 6. The controller 6 and the like housed in the housing space are sealed with the resin.

As illustrated in FIG. 1, the thermoelectric generation module 4 converts a temperature difference between the temperature of the fluid F and the ambient temperature around the detection device 1 into electric power. The thermoelectric generation module 4 is installed between a heat receiving plate and the cooling plate. In the thermoelectric generation module 4, a temperature difference between the heat receiving plate and the cooling plate generates electric power using the Seebeck effect. The thermoelectric generation module 4 includes a pair of substrates, and a thermoelectric conversion element that is arranged between the pair of substrates. The thermoelectric generation module 4 supplies the generated electric power to the detection unit 5 and the controller 6 via the first electrode unit 7 and the second electrode unit 8.

In the embodiment, the thermoelectric generation module 4 is arranged at the center of the surface 25*a* of the recess 25 in the main body portion 21 of the first member 2. In the embodiment, the thermoelectric generation module 4 receives heat from the surface 25*a* of the recess 25 in the main body portion 21 of the first member 2. The thermoelectric generation module 4 transfers the heat to the heat transfer unit 34, for cooling.

As illustrated in FIGS. 1 and 2, the detection unit 5 is an optical sensor that detects a state of impurities or the like contained in the fluid F of the device M. The detection unit 5 is arranged in the main body portion 21 of the first member 2. The detection unit 5 is driven by the electric power generated by the thermoelectric generation module 4. The detection unit 5 includes the light emitting element 51 and the light receiving element 52. The light emitting element 51 and the light receiving element 52 are arranged to face each other in a plane orthogonal to the axial direction, across the recess 24 of the first member 2. The recess 24 is filled with the fluid F, and thus, the light emitting element 51 and the light receiving element 52 are exposed to the fluid F.

The light emitting element 51 receives power supply from the thermoelectric generation module 4 to emit monochromatic light. The light emitted by the light emitting element 51 passes through the fluid F in the recess 24 of the first member 2 and reaches the light receiving element 52.

The light receiving element 52 receives the light reaching the light receiving element 52. The light receiving element 52 outputs an amount of light received, as an electric signal. The amount of light reaching the light receiving element 52, in other words, the electric signal as a result of conversion by the light receiving element 52 changes, for example, according to the amount of impurities contained in the fluid F. The electric signal after the conversion is output to a wireless communication circuit of the controller 6 via the first electrode unit 7 and the second electrode unit 8.

As illustrated in FIGS. 1 and 3, the controller 6 is housed in the main body portion 31 of the second member 3. The controller 6 is driven by power supplied from the thermoelectric generation module 4. The controller 6 includes a circuit that controls wireless communication between the detection device 1 and an external device, a circuit that outputs a control signal to the light emitting element 51 of the detection unit 5, and a circuit that receives the electric signal from the light receiving element 52 of the detection unit 5.

The controller 6 operates the light emitting element 51 of the detection unit 5 on the basis of, for example, a reception signal by wireless communication. The controller 6 outputs the control signal to the light emitting element 51 of the detection unit 5 via the first electrode unit 7 and the second electrode unit 8.

The controller 6 receives the electric signal from the light receiving element 52 of the detection unit 5. The electric signal is input to the controller 6 from the light receiving element 52 of the detection unit 5, via the first electrode unit 7 and the second electrode unit 8. The controller 6 analyzes a state of the impurities or the like contained in the fluid F of the device M on the basis of the electric signal output from the light receiving element 52. The controller 6 transmits a result of the analysis to the external device by, for example, wireless communication.

First Electrode Unit

As illustrated in FIG. 1, the first electrode unit 7 is an electrode that is arranged to electrically connect the first member 2 and the second member 3. The first electrode unit 7 is, for example, a slip ring. The first electrode unit 7 is arranged in the first member 2. More specifically, the first electrode unit 7 is arranged on the surface 25*a* of the recess 25 of the main body portion 21 of the first member 2.

Figure 4:
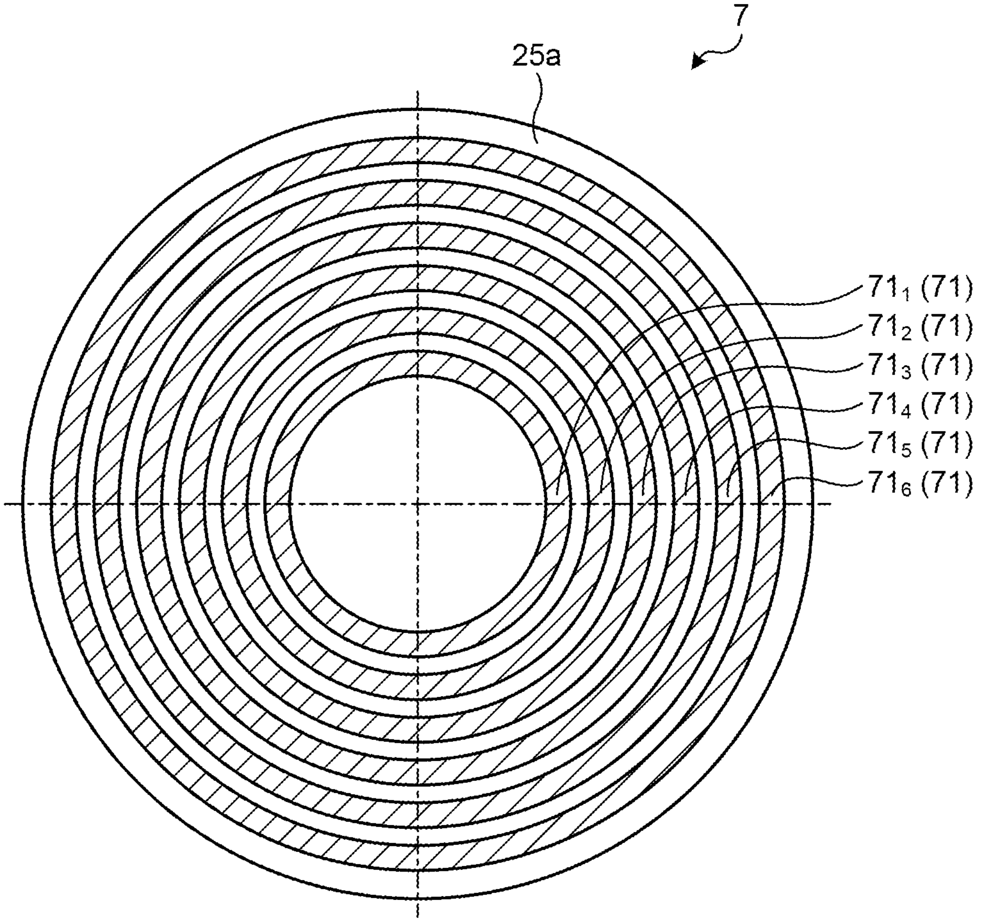
FIG. 4 is a schematic diagram illustrating an example of a first electrode unit.

FIG. 4 is a schematic diagram illustrating an example of the first electrode unit. As illustrated in FIG. 4, the first electrode unit 7 includes first electrodes 71 arranged concentrically. In the embodiment, the first electrode unit 7 includes six first electrodes $\mathbf{71}_1$, $\mathbf{71}_2$, $\mathbf{71}_3$, $\mathbf{71}_4$, $\mathbf{71}_5$, and $\mathbf{71}_6$ that are concentrically arranged. In a case where the first electrodes $\mathbf{71}_1$, $\mathbf{71}_2$, $\mathbf{71}_3$, $\mathbf{71}_4$, $\mathbf{71}_5$, and $\mathbf{71}_6$ do not need to be distinguished from one another in particular, the first electrodes $\mathbf{71}_1$, $\mathbf{71}_2$, $\mathbf{71}_3$, $\mathbf{71}_4$, $\mathbf{71}_5$, and $\mathbf{71}_6$ are described as the first electrodes 71. First electrodes 71 radially adjacent to each other are arranged at an interval.

Second Electrode Unit

As illustrated in FIG. 1, the second electrode unit 8 is an electrode that is arranged to electrically connect the first member 2 and the second member 3. The second electrode unit 8 is arranged at an axial end of the second member 3. More specifically, the second electrode unit 8 is arranged on a surface 31*a*, facing downward, of the main body portion 31 of the second member 3. A plurality of the second electrode units 8 may be arranged in the circumferential direction of the main body portion 31. In the embodiment, two second electrode units $\mathbf{8}_1$ and $\mathbf{8}_2$ are arranged. The two second electrode units $\mathbf{8}_1$ and $\mathbf{8}_2$ are arranged at positions separated by 180° in the circumferential direction of the main body portion 31. In a case where the second electrode units $\mathbf{8}_1$ and $\mathbf{8}_2$ do not need to be distinguished from each other, the second electrode units $\mathbf{8}_1$ and $\mathbf{8}_2$ are described as the second electrode units 8.

Figure 5:
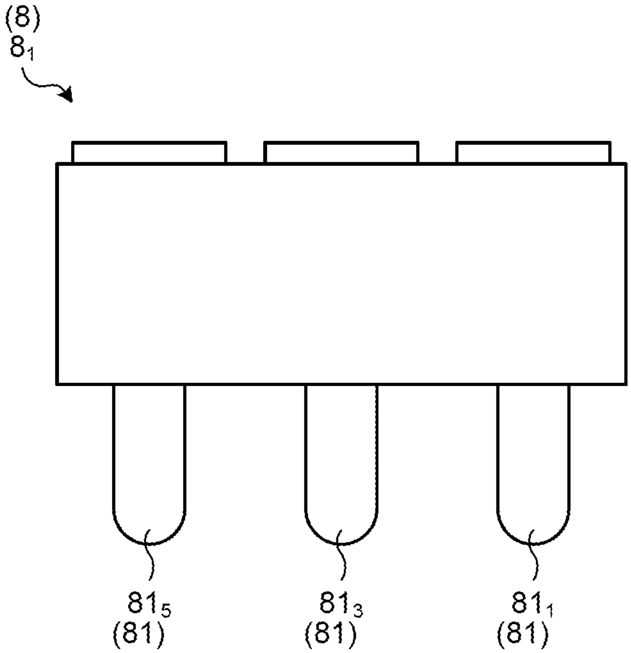
FIG. 5 is a schematic diagram illustrating an example of a second electrode unit.
Figure 6:
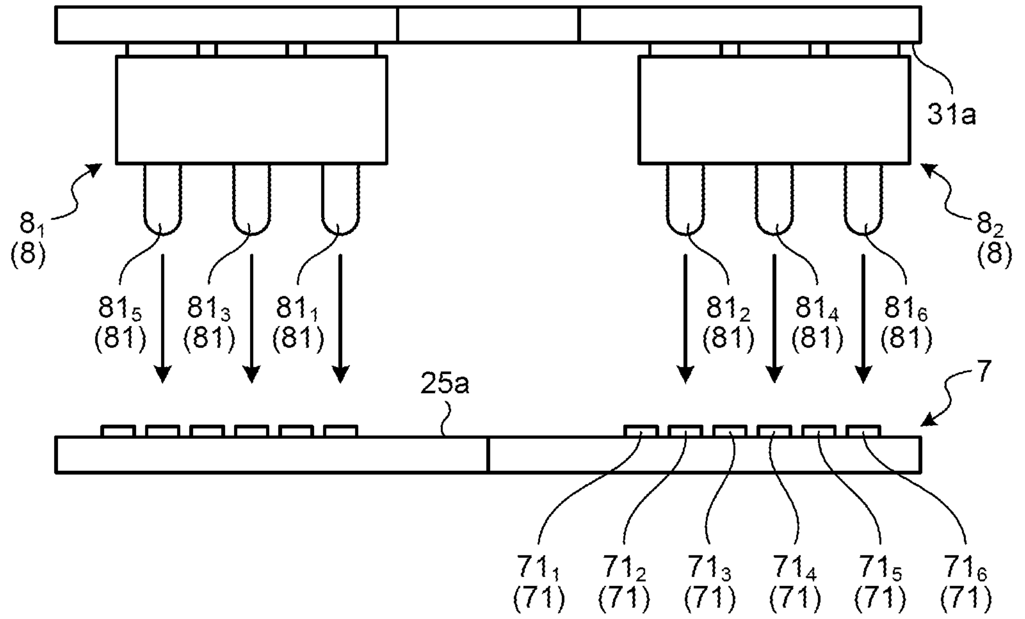
FIG. 6 is a schematic diagram illustrating the first electrode unit and the second electrode units.

FIG. 5 is a schematic diagram illustrating an example of the second electrode unit. FIG. 6 is a schematic diagram illustrating the first electrode unit and the second electrode units. As illustrated in FIG. 5, the second electrode unit 8 includes a plurality of second electrodes 81 arranged at different radial positions, in other words, at radially spaced intervals. As illustrated in FIGS. 3 and 5, in the embodiment, each second electrode unit 8 includes three second electrodes 81. The second electrode unit $\mathbf{8}_1$ includes second electrodes $\mathbf{81}_1$, $\mathbf{81}_3$, and $\mathbf{81}_5$. As illustrated in FIG. 6, the second electrode $\mathbf{81}_1$ is arranged at the same radial position as the first electrode $\mathbf{71}_1$. The second electrode $\mathbf{81}_3$ is arranged at the same radial position as the first electrode $\mathbf{71}_3$. The second electrode $\mathbf{81}_5$ is arranged at the same radial position as the first electrode $\mathbf{71}_5$. As illustrated in FIG. 3, the second electrode unit $\mathbf{8}_2$ includes second electrodes $\mathbf{81}_2$, $\mathbf{81}_4$, and $\mathbf{81}_6$. As illustrated in FIG. 6, the second electrode $\mathbf{81}_2$ is arranged at the same radial position as the first electrode $\mathbf{71}_2$. The second electrode $\mathbf{81}_4$ is arranged at the same radial position as the first electrode $\mathbf{71}_4$. The second electrode $\mathbf{81}_6$ is arranged at the same radial position as the first electrode $\mathbf{71}_6$.

As illustrated in FIG. 6, while the first member 2 and the second member 3 are assembled, each of the first electrodes 71 and each of the second electrodes 81 are electrically connected. The plurality of second electrodes 81 is electrically connected to the first electrodes 71 arranged at different radial positions. In the embodiment, the first electrode $\mathbf{71}_1$ and the second electrode $\mathbf{81}_1$, the first electrode $\mathbf{71}_2$ and the second electrode $\mathbf{81}_2$, the first electrode $\mathbf{71}_3$ and the second electrode $\mathbf{81}_3$, the first electrode $\mathbf{71}_4$ and the second electrode $\mathbf{81}_4$, the first electrode $\mathbf{71}_5$ and the second electrode $\mathbf{81}_5$, and the first electrode $\mathbf{71}_6$ and the second electrode $\mathbf{81}_6$ are electrically connected to each other.

In a case where the second electrodes $\mathbf{81}_1$, $\mathbf{81}_2$, $\mathbf{81}_3$, $\mathbf{81}_4$, $\mathbf{81}_5$, and $\mathbf{81}_6$ do not need to be distinguished from one another in particular, the second electrodes $\mathbf{81}_1$, $\mathbf{81}_2$, $\mathbf{81}_3$, $\mathbf{81}_4$, $\mathbf{81}_5$, and $\mathbf{81}_6$ are described as the second electrodes 81. In one second electrode unit 8, second electrodes 81 radially adjacent to each other are arranged at a wider interval than that between the first electrodes 71 radially adjacent to each other.

The second electrodes 81 are each formed into a needle shape axially movable forward and rearward in the axial direction. The second electrode 81 is, for example, a spring contact. The male threaded portion 33 is threadedly engaged with the female threaded portion 27 formed on the peripheral surface of the recess 26. While the male threaded portion 33 and the female threaded portion 27 on the peripheral surface of the recess 26 are threadedly engaged with each other and secured to each other, in other words, while the first member 2 and the second member 3 are assembled, the tip ends of the second electrodes 81 are pressed against the first electrodes 71 of the first electrode unit 7. The tip ends of the second electrodes 81 make contact with the first electrodes 71 of the first electrode unit 7, and thereby the first electrodes 71 and the second electrodes 81 are electrically connected.

Assembly Method and Operation

First, the first member 2 of the detection device 1 is inserted into the through-hole H of the device M. The recess 24 of the first member 2 is filled with the fluid F. Therefore, the light emitting element 51 and the light receiving element 52 of the detection unit 5 are exposed to the fluid F.

The second member 3 is assembled to the first member 2 fixed in the through-hole H. More specifically, the main body portion 31 of the second member 3 is inserted into the recess 25 and the recess 26 of the first member 2. The male threaded portion 33 formed on the outer peripheral surface of the main body portion 31 is threadedly engaged with the female threaded portion 27 formed on the peripheral surface of the recess 26. The male threaded portion 33 is threadedly engaged with the female threaded portion 27 on the peripheral surface of the recess 26, and thus, the first member 2 and the second member 3 are secured to each other. When the first member 2 and the second member 3 are assembled, the first electrodes 71 of the first electrode unit 7 and the second electrodes 81 of the second electrode units 8 in the electrode connection structure make contact with each other, and are electrically connected.

When the first member 2 and the second member 3 are assembled, the first electrodes 71 of the first electrode unit 7 and the second electrodes 81 of the second electrode units 8 make contact with each other, regardless of the positions of the second electrode units 8 in the circumferential direction. When the first member 2 and the second member 3 are assembled, each of the first electrodes 71 and each of the second electrodes 81 are electrically connected. In the embodiment, the first electrode $\mathbf{71}_1$ and the second electrode $\mathbf{81}_1$, the first electrode $\mathbf{71}_2$ and the second electrode $\mathbf{81}_2$, the first electrode $\mathbf{71}_3$ and the second electrode $\mathbf{81}_3$, the first electrode $\mathbf{71}_4$ and the second electrode $\mathbf{81}_4$, the first electrode $\mathbf{71}_5$ and the second electrode $\mathbf{81}_5$, and the first electrode $\mathbf{71}_6$ and the second electrode $\mathbf{81}_6$ are electrically connected to each other. In this manner, the first member 2 and the second member 3 are electrically connected by the electrode connection structure.

Effects

As described above, in the embodiment, the first member 2 and the second member 3 are secured to each other by threadedly engaging the female threaded portion 27 of the first member 2 with the male threaded portion 33 of the second member 3. This state makes it possible to electrically connect the first electrodes 71 of the first electrode unit 7 arranged in the first member 2, and the second electrodes 81 of the second electrode units 8 arranged on the second member 3.

In the embodiment, the first electrodes 71 of the first electrode unit 7 and the second electrodes 81 of the second electrode units 8 are configured to make contact with each other, even when the second electrode units 8 are each located at any circumferential position. Moreover, in the embodiment, each of the second electrodes 81 is axially movable forward and rearward. Therefore, in the embodiment, it is not necessary to adjust the positions of the first electrodes 71 of the first electrode unit 7 and the positions of the second electrodes 81 of the second electrode units 8, in assembling. The first member 2 and the second member 3 are configured to be readily assembled and electrically connected. In the embodiment, this configuration makes it possible to appropriately electrically connect the first member 2 and the second member 3 that are threadedly engaged with each other and secured to each other.

In the embodiment, the plurality of second electrodes 81 arranged at different radial positions are electrically connected to the first electrodes 71 arranged at different radial positions. According to the embodiment, the wiring density in the first electrode unit 7 and the second electrode units 8 can be increased.

Although the arrangement of the first electrode unit 7 in the first member 2 and the arrangement of each second electrode unit 8 on the second member 3 have been described above, the arrangement of the first electrode unit 7 and the second electrode unit 8 is not limited thereto. The first electrode unit 7 may be arranged on the second member 3, and the second electrode unit 8 may be arranged in the first member 2.

Although the arrangement of the thermoelectric generation module 4 and the detection unit 5 in the first member 2 and the arrangement of the controller 6 in the second member 3 have been described above, the arrangement of the thermoelectric generation module 4, the detection unit 5, and the controller 6 is not limited thereto. The controller 6 may be arranged in the first member 2, and the thermoelectric generation module 4 and the detection unit 5 may be arranged in the second member 3.

According to the present disclosure, the electrode connection structure and the detection device that are suitable for the members threadedly engaged with each other and secured to each other can be provided.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. An electrode connection structure comprising:

a first member comprising a first electrode unit that includes first electrodes that define first concentric circles about a center axis, the first electrodes being spaced apart from one another in a radial direction; and a second member comprising a plurality of second electrode units arranged along second concentric circles around the center axis, wherein the second electrode units include second electrodes that are spaced apart from one another in the radial direction, wherein the first member and the second member include thread portions that are disposed radially outward relative to the first electrodes and the second electrodes, respectively, and that threadedly engaged with each other to thereby electrically connect the first electrodes to the second electrodes, and wherein each of the second electrodes is a spring contact that has a needle shape that extends in an axial direction and is configured to move toward and away from the first electrodes in the axial direction.

2. The electrode connection structure according to claim 1, wherein the first electrode unit and the plurality of second electrode units are configured to rotate relative to each other, and wherein the first electrode unit and the plurality of second electrode units are configured to be electrically connected based on the first electrode unit and the plurality of second electrode units being coupled by rotation of at least one of the first electrode unit or the plurality of second electrode units.

3. The electrode connection structure according to claim 1, wherein the first electrode unit and the plurality of second electrode units are configured to rotate relative to each other, and wherein the first electrode unit and the plurality of second electrode units are configured to be electrically connected based on rotation of at least one of the first electrode unit or the plurality of second electrode units.

4. The electrode connection structure according to claim 1, further comprising a main body portion that includes the plurality of second electrode units.

5. The electrode connection structure according to claim 1, wherein the second electrode units include:

a first plurality of second electrodes arranged at first radial positions with respect to the center axis and configured to electrically connect to a first portion of the first electrodes; and a second plurality of second electrodes arranged at second radial positions with respect to the center axis and configured to electrically connect to a second portion of the first electrodes.

6. The electrode connection structure according to claim 5, wherein at least one of the first plurality of second electrodes is configured to contact one of the first concentric circles.

7. The electrode connection structure according to claim 5, wherein at least one of the second plurality of second electrodes is configured to contact one of the first concentric circles.

8. The electrode connection structure according to claim 5, wherein the first radial positions are opposite to the second radial positions, respectively, with respect to the center axis.

9. A detection device comprising:

the electrode connection structure according to claim 1;

a thermoelectric module;

a sensor; and a controller.

10. The electrode connection structure according to claim 1, wherein the second member comprises a main body portion that protrudes toward the first member, wherein the first member defines a recess that receives the main body portion of the second member, and wherein the thread portions include:

a male threaded portion defined at an outer peripheral surface of the main body portion of the second member and disposed radially outward relative to the second electrodes, and a female threaded portion defined at an inner peripheral surface of the recess of the first member and disposed radially outward relative to the first electrodes.

11. The electrode connection structure according to claim 1, wherein the plurality of second electrode units comprises a first-side second electrode unit and a second-side second electrode unit that are spaced apart from each other in the radial direction across the center axis, and wherein each of the first-side second electrode unit and the second-side second electrode unit includes one or more of the second electrodes.

12. The electrode connection structure according to claim 1, wherein the first electrodes are spaced apart from one another by a first interval in the radial direction, and wherein the second electrodes are spaced apart from one another in the radial direction by a second interval greater than the first interval, each of the second electrodes being configured to contact one of the first electrodes.

13. An electrode connection structure comprising:

a first member comprising a first electrode unit that includes first electrodes that define first concentric circles about a center axis, the first electrodes being spaced apart from one another in a radial direction; and a second member comprising a plurality of second electrode units arranged along second concentric circles around the center axis, wherein the second electrode units include second electrodes that are spaced apart from one another in the radial direction, wherein the first member and the second member are threadedly engaged with each other and electrically connect the first electrodes to the second electrodes, wherein each of the second electrodes is a spring contact that has a needle shape that extends in an axial direction and is configured to move toward and away from the first electrodes in the axial direction, wherein the second electrode units include:

a first plurality of second electrodes arranged at first radial positions with respect to the center axis and configured to electrically connect to a first portion of the first electrodes, and a second plurality of second electrodes arranged at second radial positions with respect to the center axis and configured to electrically connect to a second portion of the first electrodes, wherein the first portion of the first electrodes includes a first part of the first concentric circles, and the second portion of the first electrodes includes a second part of the first concentric circles, and wherein the first part of the first concentric circles and the second part of the first concentric circles are a plurality of concentric circles that are spaced apart from one another and alternately arranged along the radial direction.

* * * * *